June 8, 1937.   T. ZUSCHLAG   2,082,997
ELECTRICAL ANALYSIS APPARATUS
Filed March 23, 1934   2 Sheets-Sheet 1
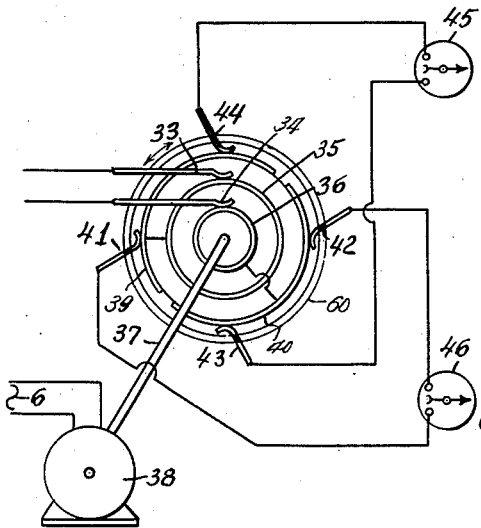
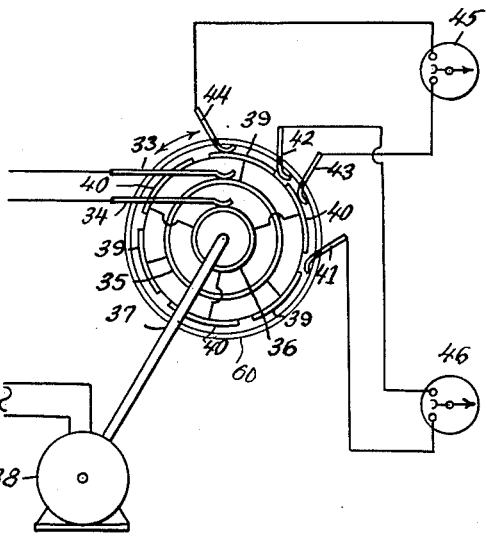
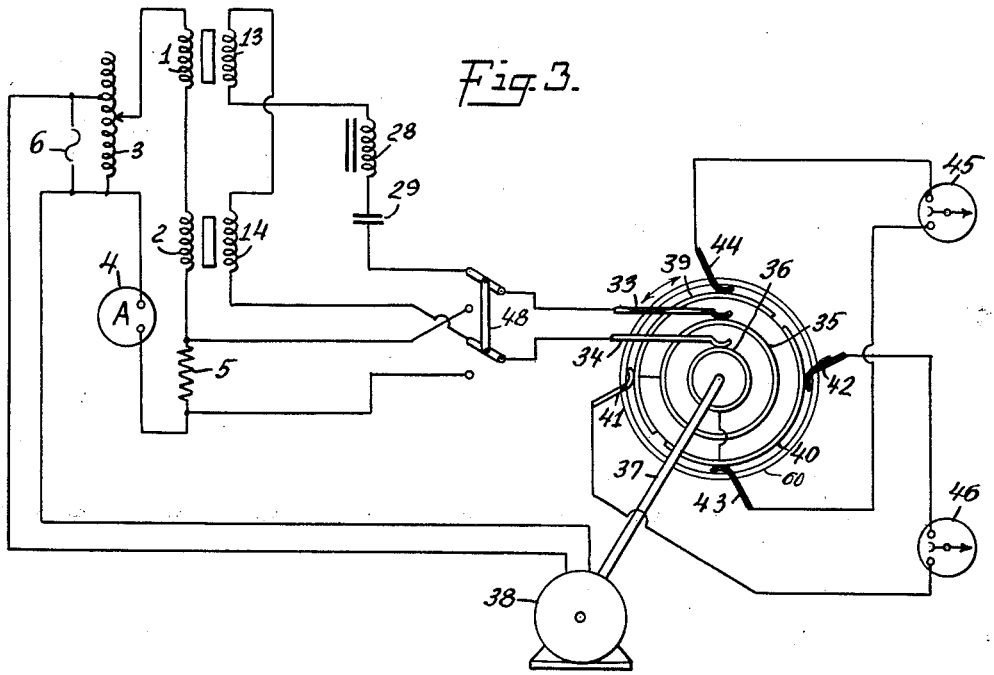
INVENTOR
*Theodor Zuschlag*
BY
*Pennie, Davis, Marvin & Edmonds*
ATTORNEYS June 8, 1937.  T. ZUSCHLAG  2,082,997
ELECTRICAL ANALYSIS APPARATUS
Filed March 23, 1934   2 Sheets-Sheet 2
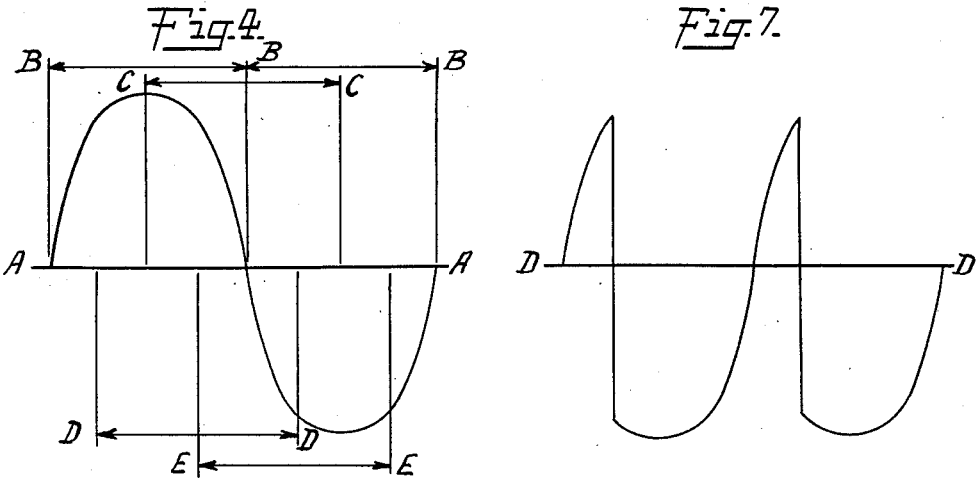
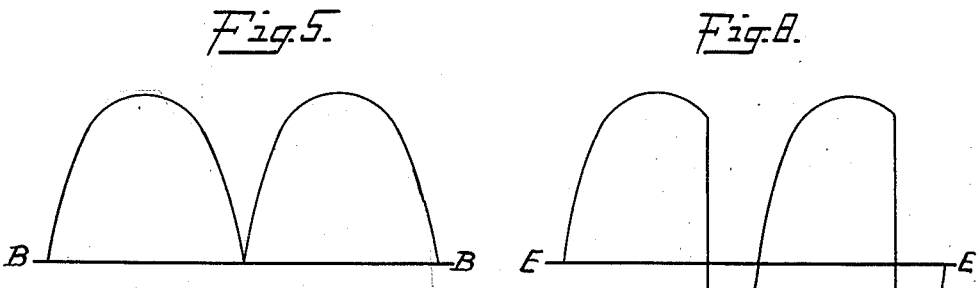
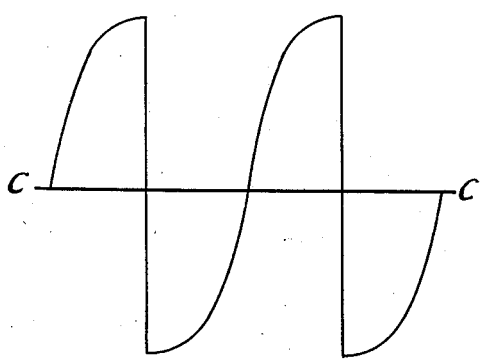
INVENTOR
Theodor Zuschlag
BY
ATTORNEYS Patented June 8, 1937

2,082,997

UNITED STATES PATENT OFFICE 2,082,997

ELECTRICAL ANALYSIS APPARATUS

Theodor Zuschlag, Englewood, N. J., assignor to Magnetic Analysis Corporation, Long Island City, N. Y., a corporation of New York Application March 23, 1934, Serial No. 716,941

13 Claims. (Cl. 175—183)

This invention relates to electrical analysis and has for its object improvements in apparatus for electrical measurement. More specifically, the invention contemplates the analysis of an alternating current into two or more components, displaced from each other by a substantially constant phase angle, and the presentation of the integrated values of these components for inspection.

In electrical analysis and its kindred industrial applications it is frequently desirable to determine the characteristics of an alternating current. Among other factors which are frequently sought to be discovered are wave form, frequency, amplitude, phase relationship, etc. In the heretofore customary art of electrical analysis some of these factors have been determinable by reproducing for inspection the wave form of the alternating current by means of oscillographic types of instruments. Analysis of alternating currents, by these means, while sometimes satisfactory, has been subject to the objection that the apparatus involved was costly, delicate and required considerable operating skill. Hence for many electrical measurements the use of oscillographic types of instruments has been precluded by the character of the work.

As a result of my investigations I have discovered that it is possible to acquire the more useful information regarding an alternating current by breaking up the successive cycles with respect to two or more arbitrary origins displaced from each other by constant phase angles, delivering said components to current indicating means and integrating the components therein. The simultaneous indication of the phased displaced components permits the reconstruction of the current curve.

Rarely does an alternating current obtained in commercial practice consist of a simple harmonic wave. More frequently, the current is complex and contains several harmonics of the base frequency. In the analysis of such a current it is desirable in some instances to suppress all but one harmonic, and analyze this in accordance with the principles of my invention. Accordingly, in one of the aspects of my invention a complex alternating current is filtered prior to analysis. The filter means may be of many of the well-known forms. In practice I have found that a suitable inductance and a suitable capacitance in series with each other are satisfactory as a filter means.

My invention will be better understood by reference to the following description in conjunction with the accompanying drawings, in which Fig. 1 represents a form of a two component indicator of my invention;

Fig. 2 is a modified form of a two component indicator of my invention;

Fig. 3 is a schematic representation of a magnetic analysis circuit into which the two component indicator of Fig. 1 has been incorporated; and Figs. 4, 5, 6, 7, and 8 are wave diagrams illustrative of the principles of the invention.

Referring to Fig. 1 it will be seen that a commutator 37 is mounted on the shaft of a two-pole synchronous motor 38 which is energized by a source of alternating current 6. The commutator 37 is equipped with two separate commutator segments 39 and 40 which are connected respectively to two contact rings 35 and 36.

Two pairs of diametrically opposed brushes 41, 42 and 43, 44 are symmetrically disposed around the periphery of the commutator in contact with the segments 39 and 40. The two brush pairs are 90° phase displaced from each other and may be moved in unison around the periphery of the commutator by means of a rotatable brush holder 60. The rotatable brush holder is shown diagrammatically and may be of any appropriate conventional form. A D'Arsonval or other type of integrating galvanometer 46 is connected in series between brushes 41 and 42, and a similar galvanometer 45 is connected to brushes 41 and 42. Brushes 33 and 34 are in contact with rings 35 and 36, respectively, of the commutator and deliver the current which is to be rectified to the commutator. The current to be rectified is of the same base frequency as that which drives the synchronous motor 38, and may be derived either directly or by induction from the same alternating current source.

When a sinusoidal voltage is impressed across the commutator through brushes 33 and 34, and thence through contact rings 35 and 36 and contact segments 39 and 40, the brush pairs 41, 42 and 43, 44 deliver a rectified voltage to the galvanometers 46 and 45. The character of this rectified voltage may best be explained with reference to Figs. 4 to 8.

The curve A—A of Fig. 4 represents one cycle of the voltage impressed between brushes 33 and 34. A position of brush pair 41, 42 with respect to the cycle is represented by B—B on this diagram, and similarly a position of the brush pair 43, 44 which is 90° phased displaced from brush pair 41, 42, is represented on the diagram by C—C. When the brush pairs are located at B—B and C—C, the resultant rectified voltages are as represented by Figs. 5 and 6. The curve B—B of Fig. 5 represents the wave picked up by brush pair 41, 42, and is a typical fully rectified alternating current wave. The curve C—C of Fig. 6 shows the shape of the wave across brush pairs 43, 44. It will be apparent that the curve B—B of Fig. 5 is the usual form for rectified voltage and will cause a pronounced deflection of the integrating galvanometer 46. The curve C—C on the other hand, is equally distributed on either side of the axis or abscissa and integration by means of the galvanometer 45 produces a zero reading on this instrument. Curves B—B and C—C represent a condition of symmetrical rectification. However, if the brush pair 41, 42 is located at points D—D of Fig. 4 and brush pair 43, 44 is located at points E—E, the resultant voltage waves are shown respectively by Figs. 7 and 8. These waves, D—D and E—E are unsymmetrically rectified, and the proportion of the curves on either side of the abscissas are unequal. Integration of these waves by the galvanometers will result in decided deflections of both galvanometers. From these deflections it is possible to reconstruct the wave form and the voltage vector of the curve A—A.

The apparatus of Fig. 1 is adapted to an investigation of the primary harmonic of the alternating current. In some instances it may be desirable or necessary to investigate an additional harmonic of the current, say the third. In this case it will be necessary to suppress all but the desired harmonic by inserting a filter in the circuit. It will also be necessary to increase the speed of the commutator 37 three times, or to replace it with the type of commutator shown in Fig. 2.

Referring now to Fig. 2, which illustrates a commutator designed for the analysis of the third harmonic of the current under investigation, it will be seen that in general it corresponds to construction of the synchronous commutator shown in Fig. 1. However, the number of commutating segments 39, 40, has been tripled and the arrangement of the brushes 41, 42 and 43, 44 has been changed in accordance with the new arrangement of the commutating segments. In practice it is sometimes desirable to combine the synchronous commutator illustrated by Fig. 1 and Fig. 2 upon a common shaft to facilitate an easy change from one to the other when both the first and third harmonics are to be investigated.

Fig. 3 illustrates an application of a two component indicator of the type illustrated in Fig. 1 in a magnetic analysis apparatus. Referring to Fig. 3, two primary induction coils 1 and 2 are connected in series with a fixed resistor 5 and an ammeter 4 to the outlet side of an autotransformer 3. The autotransformer is energized by an alternating current source 6. The primary coils are preferably identical and constructed of a suitable number of turns of insulated copper wire of low ohmic resistance. Secondary coils 13 and 14 are disposed respectively in inductive relationship with the primary coils and are connected in series opposition with a filter comprising a suitable inductance 28 and a capacitance 29 to the contact points of a double-pole double-throw switch 48. Because the commutator arrangement shown is adapted to the analysis of the first harmonic of the exciter current the filter 28 and 29 is designed to suppress all harmonics of exciter current except the first. The remaining contact points of the switch 48 are connected, respectively, to either side of the fixed resistor 5 which, as has been observed, is located in the primary circuit. The construction of the commutator 37 is exactly as has been described for Fig. 1. The commutator 37 is actuated by a double-pole synchronous motor 38 which receives its current from the alternating current source 6. The contact arms of switch 48 are connected to brushes 33, 34 of the synchronous commutator by suitable leads. The two brush pairs of the commutator are 90° phase displaced as in the case of Fig. 1.

In the operation of the device of Fig. 3, switch 48 is first located upon the contact points which are connected on either side of the resistor 5. A standard A, whose magnetic characteristics are known, is inserted in the field of coils 1 and 13, and a specimen B, whose magnetic charactertistics are to be determined, are inserted in the field of coils 2 and 14. The apparatus is then energized and the movable brushes 41, 42 and 43, 44 are adjusted upon the periphery of the synchronous commutator 37 until one galvanometer, for instance 45, shows a maximum, and the other galvanometer 46 a zero reading. This manipulation permits the correlation of the phase of the two indicator readings with the phase of the primary exciter current. This having been accomplished, switch 48 is closed upon the secondary circuit. If the magnetic characteristics of standard A and specimen B are not identical, differential secondary current will be established in the secondary circuit across the brushes 34, 33. The filter 28, 29 serves to eliminate all but the first harmonic of the differential current so that the resulting wave form is truly sinusoidal. This induced differential current is then analyzed into two components 90° phase displaced, the displacement being correlated with the phase of the primary exciter current.

A more specific application of the two component indicator of this invention to a magnetic analysis problem is set forth in my co-pending application, Serial Number 716,943, filed March 23, 1934. The application of the commutator is not, however, limited to the art of magnetic analysis. Numerous other applications will undoubtedly occur to the man skilled in the art.

The indicators employed in my apparatus may be either of the directly indicating or of the automatic recording type. In the latter case, the apparatus permits the automatic registration of the two phase displaced components, an accomplishment which has not been possible heretofore.

It will be apparent that the indicators need not necessarily be of the D'Arsonval type since any galvanometer which performs an integrating function may be substituted for the D'Arsonval type of instrument. Because of their relatively rugged construction, D'Arsonval galvanometers are preferable in most industrial applications.

I claim:

1. Apparatus for analyzing alternating current which comprises a synchronous motor receiving power from the same source as the alternating current to be analyzed and adapted to rotate in synchronism with the basic harmonic of said current, a synchronous commutator mounted on the shaft of said motor and rotatable at the same speed as the motor, said commutator having two contact rings to which the current to be analyzed is supplied through a circuit including a filter adapted to suppress all but the third harmonic of the current and having three pairs of commutator segments spaced equi-angularly around its periphery with alternate segments connected to the same contact ring, two pairs of brushes movable in unison about the periphery of the commutator, each brush pair being spaced substantially 60° from each other, means for introducing a second alternating current into the commutator through the contact rings and two integrating current indicators connected with respective pairs of brushes and adapted to receive and integrate rectified components of the third harmonic of the current to be analyzed.

2. Apparatus for analyzing alternating current which comprises a synchronous motor deriving power from the same source as the alternating current and adapted to rotate in synchronism with the basic harmonic of said current, a synchronous commutator connected to said motor and rotatable at the same speed as the motor, said commutator having contact rings connected in a circuit with a filter adapted to suppress all but one harmonic of the current to be analyzed and having a plurality of pairs of contact segments spaced around its periphery with alternate segments connected to the same contact ring, the number of the pairs of contact segments being equal to the multiple of the harmonic which is not suppressed by the filter, a plurality of brush pairs disposed about the periphery of the commutator, and a plurality of integrating current indicators connected with respective brush pairs.

3. Apparatus for analyzing alternating current which comprises a synchronous commutator adapted to be rotated in synchronism with the alternating current to be analyzed and having contact rings to which the alternating current to be analyzed may be delivered, brush pairs disposed from each other by a constant angle and movable in unison around the periphery of the commutator, means for introducing a second alternating current into the contact rings of the commutator and integrating galvanometers connected across respective brush pairs and adapted to receive and integrate components of successive cycles of alternating current, whereby phase differences between the alternating current to be analyzed and the second alternating current may be determined.

4. Apparatus for analyzing alternating current which comprises a synchronous commutator adapted to be rotated in synchronism with the alternating current to be analyzed by means of a synchronous motor and having contact rings connectible by means of brushes with the supply of current to be analyzed, brush pairs displaced from each other by a constant angle and movable in unison about the periphery of the commutator and connectible with segments of the commutator which in turn are connected to the contact rings, means for introducing a second alternating current into the contact rings of the commutator, integrating galvanometers connected in series across brush pairs and adapted to receive and integrate rectified alternating current, whereby the phase displacement between the alternating current to be analyzed and the second alternating current may be determined.

5. Apparatus for analyzing alternating current which comprises a synchronous commutator having two contact rings adapted to receive the alternating current to be analyzed through a pair of brushes and two commutator segments connected with the respective contact rings, said commutator being adapted to rotate in synchronism with the first harmonic of the alternating current to be analyzed, two pairs of diametrically opposed brush pairs displaced at right angles to each other and movable in unison around the commutator segments, one brush of each pair being adapted to establish moving contact with one commutator segment while the other brush of the pair is in contact with the other contact segment, means for introducing a second alternating current into the contact rings of the commutator, and a pair of integrating galvanometers connectible in series with their respective diametrically opposed brush pairs and adapted to receive and integrate rectified current, whereby the phase displacement between the alternating current to be analyzed and the second alternating current may be determined.

6. Apparatus according to claim 5 in which a filter adapted to suppress all but the first harmonic of the alternating current to be analyzed is operatively associated with said commutator.

7. Apparatus according to claim 5 in which the commutator is connected directly to the shaft of a synchronous motor which derives power from the same source as the alternating current to be analyzed.

8. Apparatus according to claim 5 in which the integrating galvanometers are of the D'Arsonval type.

9. In an apparatus for electrical analysis the combination comprising a synchronous commutator having contact rings and a plurality of diametrically opposed brush pairs, means for introducing the alternating current to be analyzed into the contact rings of the commutator, means for introducing another alternating current into the contact rings of the commutator, a plurality of integrating current indicators connected respectively in series to diametrically opposed brush pairs, means for rotating the synchronous commutator in synchronism with the alternating current to be analyzed, and switching means whereby the flow of the alternating current to be analyzed or the second alternating current to the contact rings of the commutator may be interrupted.

10. Apparatus for analyzing alternating current which comprises a synchronous commutator having contact rings, a plurality of pairs of diametrically opposed brushes in movable contact with said contact rings, a plurality of integrating current indicating instruments connected respectively to the diametrically opposed brush pairs, means for introducing the alternating current to be analyzed into the contact rings of the commutator, means for introducing a second alternating current into the contact rings of the commutator, the frequency of said alternating current being a multiple of the current undergoing investigation, and a synchronous motor adapted to receive current from the same source as the alternating current to be analyzed, said synchronous motor being connected mechanically to the synchronous commutator and adapted to rotate in synchronism with the harmonic of the current under investigation.

11. Apparatus according to claim 10 provided with a filter means to suppress all harmonics of the alternating current except the one under investigation.

12. Apparatus according to claim 10 in which the brush pairs are movable in unison around the periphery of the commutator.

13. Apparatus according to claim 10 in which the filter means consists of a capacitance in series with an inductance.

THEODOR ZUSCHLAG.